Jan. 24, 1961
J. HENCHERT
2,969,166
RECLOSABLE CONTAINER
Filed March 7, 1958
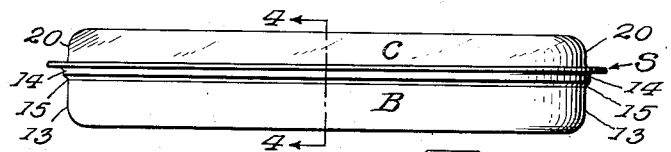
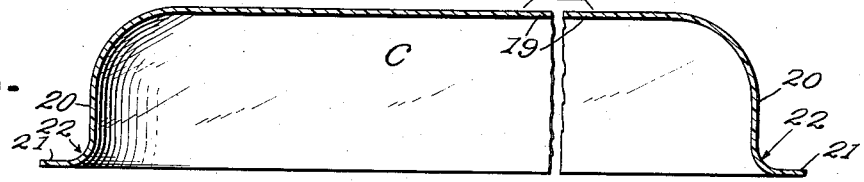
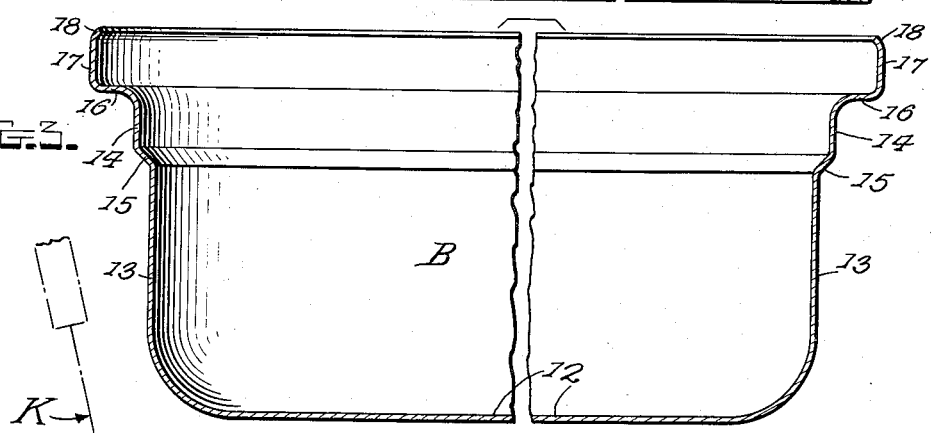
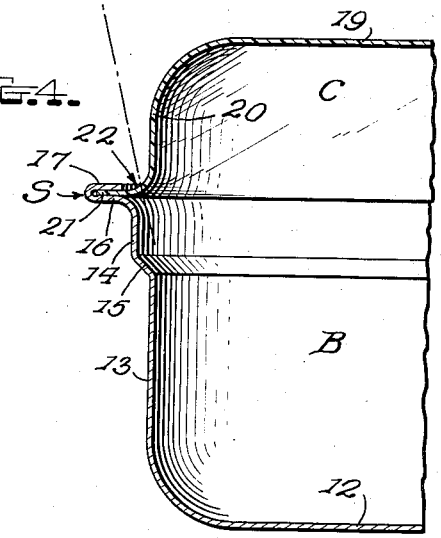
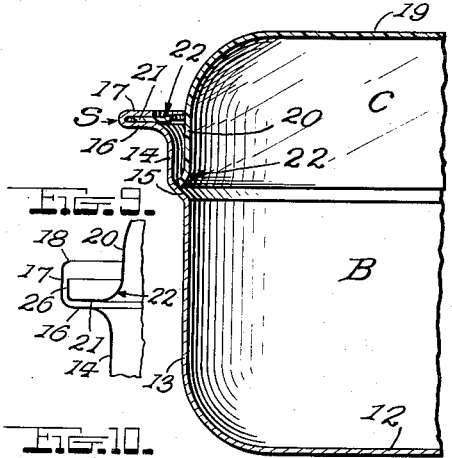
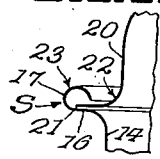
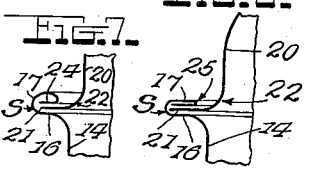
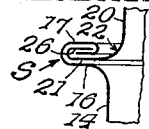
INVENTOR
John Henchert.
BY
Mason, Porter, Diller & Stewart
ATTORNEYS

United States Patent Office 2,969,166
Patented Jan. 24, 1961

2,969,166
RECLOSABLE CONTAINER

John Henchert, River Forest, Ill., assignor to Continental Can Company, Inc., New York, N.Y., a corporation of New York Filed Mar. 7, 1958, Ser. No. 719,839

4 Claims. (Cl. 220—48)

This invention relates to a new and improved container intended primarily for, but not restricted to the marketing of food products, such as sliced luncheon meats and the like, and capable of reclosure whenever some of the contents are to be kept for later use, after container opening.

A container cover having a depending skirt, is seamed onto the side wall of a container body and the cover skirt is adapted for severance from the seam to open the container: and the principal object of the invention is to provide said side wall with an outwardly offset portion at its upper end onto which the cover skirt is seamed, said offset portion providing said wall with an upwardly facing internal shoulder and being dimensioned to receive the cover skirt when the cover is to be used as a reclosure for the container, at which time the skirt rests on the shoulder.

Another object is to provide the offset wall portion with a lateral flange, and to provide the skirt with a lateral flange seamed onto the wall flange, the juncture zone between the skirt and its flange being upwardly exposed to permit cutting thereof to open the container.

A further object is to provide the seam between the two flanges with a continuous portion spaced slightly outward from the cover skirt and constituting a guide when cutting the aforesaid juncture zone between the skirt and its flange.

A still further object is to provide a novel construction well suited for a container having a thin cover of plastic or aluminum foil for convenient cover cutting and removal, and capable of tight sealing, permitting protection of the contents by vacuum packing if desired.

With the above and other objects in view that will hereinafter appear, the nature of the invention will be more clearly understood by reference to the following detailed description, the appended claims and the several views illustrated in the accompanying drawings.

In the drawings:

Figure 1 is a side elevation of the preferred form of container.

Figures 2 and 3 are enlarged vertical sectional views showing the preferred container cover and body, respectively, before seaming them together.

Figure 4 is a fragmentary vertical sectional view showing the body and cover seamed together and illustrating a container-opening knife by broken lines.

Figure 5 is a fragmentary vertical sectional view showing the cover of Figures 2 and 4 used as a reclosure for the container.

Figures 6 to 8 and 10 are diagrams illustrating different seams which may be employed instead of the seam shown in Figures 4 and 5.

Figure 9 is a diagram showing cover and body portions which are rolled together to form the double seam of Figure 10.

The container body B may well be formed from tin plate and the cover C from transparent plastic, although other materials could well be employed.

The body B is initially shaped as shown in Figure 3 to form it with a bottom 12; with a continuous side wall 13; with a continuous outwardly offset portion 14 at the upper end of the wall 13 and providing a continuous upwardly facing internal shoulder 15; with a continuous lateral flange 16 at the upper end of the offset portion 14; and with a continuous upward flange extension 17 on the outer edge of the flange 16 and having an inwardly curved edge 18. The elements 12 to 18 are integrally joined and may be readily formed by metal drawing operations.

The cover C comprises a top 19, a depending skirt 20, and a lateral flange 21 on the lower end of said skirt 20. The skirt 20 and its flange 21 are integral: and the juncture region 22 between said flange 20 and the major portion of the skirt, is preferably curved on a short radius. The diameter of the cover skirt 20 is preferably about the same as that of the body side wall 13; the outer diameter of the skirt flange 21 is only slightly less than the internal diameter of the inturned edge 18 of the flange extension 17; and the radial width of said skirt flange 21 is only slightly less than that of the body wall flange 16. The cover may be readily shaped from a thermo-plastic sheet.

After placing the contents in the container body B, the cover C is applied with the skirt flange 21 resting on the wall flange 16 and surrounded by the flange extension 17. If desired, a conventional sealing compound (not shown) may be employed between the two flanges 16 and 21. These flanges are seamed together in any of various ways and the seam is identified at S in the various views. In the preferred construction (Figure 4) the flange extension 17 is simply turned in over the skirt flange 16 and tightly clinched against said skirt flange 16.

In Figure 6, the flange extension 17 is curled inwardly and downwardly at 23 onto the skirt flange 21. In Figure 7, a similar curl plus an outward terminal portion 24 is given to the flange extension 17. In Figure 8, the extension flange 17 is first folded inwardly upon itself at 25 and then folded inwardly and downwardly against the skirt flange 21. In Figure 9, the skirt flange 21 has an extension flange 26. The two extension flanges 17 and 26 are rolled together to provide the double seam of Figure 10.

In order to open the container, regardless of the form of the side seam S, the upwardly exposed juncture zone 22 between the skirt 20 and its flange 21, is severed, for example by a knife K (Figure 4). During this severance, the inner edge of the downwardly clinched extension flange 17 of the side seam in Figure 4, or the generally corresponding continuous portion of any of the other side seams, may be utilized as a convenient guide for the knife.

When part of the contents have been removed from the opened container, the cover C, minus its cut-off flange 21, is downwardly seated within the offset wall portion 14 and then rests on the shoulder 15, as seen in Figure 5, thereby providing an effective reclosure.

It is possible to provide a container opener having a cutting roll and a container guiding means. Such an opener could be made to so accurately cut the zone 22 that the flange remnant left on the skirt 20, would accurately and frictionally engage the offset wall portion 14 as well as resting on the shoulder 15, thereby providing for tight reclosing of the container.

From the foregoing, it will be seen that a novel and advantageous construction has been disclosed for attaining the desired ends. However, attention is invited to the possibility of making variations.

I claim:

1. A reclosable container comprising a body having a bottom and a continuous side wall, an upper end portion of said side wall being outwardly offset to provide said side wall with a continuous internal upwardly facing shoulder and an upper offset side wall portion disposed outwardly of said shoulder, a cover having a top wall and a depending skirt, a projection of said skirt intersecting said shoulder, and a seam between said offset side wall portion and said skirt, said seam being disposed outwardly of said skirt and said skirt terminating below said top wall, whereby when said cover is severed from said body adjacent said seam, said cover may be partially telescoped into said body with said skirt engaging and forming a seal with said shoulder.

2. The container of claim 1 wherein said shoulder slopes upwardly and outwardly thus assuring a seal with said skirt.

3. The container of claim 1 wherein said seam includes an outwardly directed flat flange at the upper edge of said offset side wall portion and an outwardly directed flat flange at the lower edge of said skirt resting upon said side wall flat flange, said side wall flat flange terminating in a continuous seam portion disposed over said skirt flat flange.

4. The container of claim 1 wherein said seam includes an outwardly directed flat flange at the upper edge of said offset side wall portion and an outwardly directed flat flange at the lower edge of said skirt resting upon said side wall flat flange, said side wall flat flange terminating in a continuous seam portion disposed over said skirt flat flange, said continuous seam portion being in the form of a third flat flange folded inwardly on said skirt flat flange, said third flat flange being spaced outwardly of said skirt to upwardly expose the juncture zone between said skirt and its flat flange and to act as a guide when cutting through said juncture zone to open the container.

References Cited in the file of this patent

UNITED STATES PATENTS

| | | |
|---|---|---|
| 1,072,789 | Taylor | Sept. 9, 1913 |
| 2,027,437 | Karl | Jan. 14, 1936 |
| 2,432,496 | Beason | Dec. 16, 1947 |
| 2,523,285 | Erb | Sept. 26, 1950 |

FOREIGN PATENTS

| | | |
|---|---|---|
| 8816/27 | Australia | Dec. 6, 1927 |